US011516313B2

(12) United States Patent
de Campos Ruiz et al.

(10) Patent No.: US 11,516,313 B2
(45) Date of Patent: Nov. 29, 2022

(54) LANGUAGE BINDING FOR DDS TYPES THAT ALLOWS PUBLISHING AND RECEIVING DATA WITHOUT MARSHALING

(71) Applicant: Real-Time Innovations, Inc., Sunnyvale, CA (US)

(72) Inventors: Alejandro de Campos Ruiz, San Jose, CA (US); Harishkumar Umayi Kalyanaramudu, Santa Clara, CA (US); Gerardo Pardo-Castellote, Santa Cruz, CA (US); Fernando Crespo Sanchez, San Jose, CA (US)

(73) Assignee: Real-Time Innovations, Inc., Sunnyvale, CA (US)

( * ) Notice: Subject to any disclaimer, the term of this patent is extended or adjusted under 35 U.S.C. 154(b) by 0 days.

(21) Appl. No.: 17/363,690

(22) Filed: Jun. 30, 2021

(65) Prior Publication Data
US 2022/0131954 A1    Apr. 28, 2022

Related U.S. Application Data

(63) Continuation of application No. 16/823,324, filed on Mar. 18, 2020, now Pat. No. 11,108,892.
(Continued)

(51) Int. Cl.
*H04L 69/00* (2022.01)
*H04L 67/1097* (2022.01)
(Continued)

(52) U.S. Cl.
CPC .............. *H04L 69/03* (2013.01); *H04L 67/10* (2013.01); *H04L 67/1097* (2013.01);
(Continued)

(58) Field of Classification Search
CPC ..... H04L 67/1097; H04L 67/26; H04L 67/10; H04L 67/12; H04L 67/125; H04L 69/03;
(Continued)

(56) References Cited

U.S. PATENT DOCUMENTS 7,783,853 B1 *   8/2010  Rhee ...................... G06F 9/542
                                                          711/170
2021/0373982 A1 * 12/2021 Neilson .................. G06F 9/542

OTHER PUBLICATIONS

Jose M. Lopez-Vega, "A content-aware bridging service for publish/subscribe environments", Jul. 11, 2012, The Journal of Systems and Software 86 (2013) pp. 108-124 (Year: 2012).*
(Continued)

*Primary Examiner* — John M Macilwinen
*Assistant Examiner* — Rachel J Hackenberg
(74) *Attorney, Agent, or Firm* — Lumen Patent Firm

(57) ABSTRACT

A method for reducing a number of copies required to send a data sample with a Data Distribution Service (DDS) type in a system using an Object Management Group (OMG) Data Distribution Service (DDS) and a Real-Time Publish Subscribe (RTPS) protocol is provided. Key to the invention is the definition/creation of a memory representation of the data samples for the DDS type that is equal to the network representation of the data samples for the DDS type. Sending of data samples to the DataReader is accomplished without making a serialization copy of the data samples, and for the receiving the data samples from the DataWriter is accomplished without making a deserialization copy of the data samples. Further, a method is provided for accessing to a network representation of data samples with a DDS type in a system using an OMG DDS and a RTPS protocol.

10 Claims, 15 Drawing Sheets

Related U.S. Application Data

(60) Provisional application No. 62/823,527, filed on Mar. 25, 2019.

(51) Int. Cl.
*H04L 67/12* (2022.01)
*H04L 67/10* (2022.01)
*H04L 69/18* (2022.01)

(52) U.S. Cl.
CPC .............. *H04L 67/12* (2013.01); *H04L 69/02* (2013.01); *H04L 69/18* (2013.01)

(58) Field of Classification Search
CPC ....... H04L 69/02; H04L 69/164; H04L 69/18; H04L 69/321; H04L 69/162; H04L 69/163; H04L 69/161
See application file for complete search history.

(56) References Cited

OTHER PUBLICATIONS

Kai Beckmann, "A Wireless Sensor Network Protocol for the OMG Data Distribution Service", 2012, 10th International Workshop on Intelligent Solutions in Embedded Systems, Distributed Systems Lab, RheinMain University of Applied Sciences, pp. 45-50 (Year: 2012).*

Gerardo Pardo-Castellote, "OMG Data-Distribution Service: Architectural Overview", 2003, Real-Time Innovations, Inc. Proceedings of the 23rd International Conference on Distributed Computing Systems Workshops (ICDCSW'03), pp. 1-7 (Year: 2003).*

Hyung-Jun Yim, "A Meta-Model Transformation between DDS and DBMS Representation of Data for DDS-DB Integration", International Journal of Software Engineering and Its Applications, vol. 7, No. 3, May 2013, pp. 117-125 (Year: 2013).*

* cited by examiner

| DHEADER Length: 8 | x | y |

FIG. 1

| DHEADER : Length: 12 | x | y | z |

FIG. 2

| DHEADER Length: 16 | EMHEADER Length: 4 ID: 1 | x | EMHEADER Length: 4 ID: 2 | y |

FIG. 3

| DHEADER Length: 24 | EMHEADER Length: 4 ID: 1 | x | EMHEADER Length: 4 ID: 3 | z | EMHEADER Length: 4 ID: 2 | y |

FIG. 4

Small Sample Latency

Large Sample Latency

LANGUAGE BINDING FOR DDS TYPES THAT ALLOWS PUBLISHING AND RECEIVING DATA WITHOUT MARSHALING

CROSS-REFERENCE TO RELATED APPLICATIONS

This application is a continuation of U.S. patent application Ser. No. 16/823,324 filed Mar. 18, 2020, which is incorporated herein by reference. U.S. patent application Ser. No. 16/823,324 claims priority from U.S. Provisional Patent Application 62/823,527 filed Mar. 25, 2019, which is incorporated herein by reference.

FIELD OF THE INVENTION

This invention relates to Language Binding for Data Distribution Service (DDS) for Real-time Systems in which applications publish and receive data.

BACKGROUND OF THE INVENTION

Data Distribution Service and Type System

Many distributed systems employ a publish-subscribe data exchange in which applications publish data samples, which become available to remote applications interested in them.

Data Distribution Service (DDS) for Real-time Systems is a specification of a publish/subscribe middleware for distributed systems. As a networking middleware, DDS simplifies network programming. It implements a publish/subscribe model for sending and receiving data samples among software applications. The software applications create publishing and subscribing endpoints.

The publishing endpoints, called DataWriters, publish data samples for a Topic (e.g. image, temperature, location). The subscribing endpoints, called DataReaders, receive the data samples published by the DataWriters on a Topic.

DDS takes care of delivering the data samples to all DataReaders that declare an interest in a Topic. Delivering a sample requires marshalling the sample. Marshalling, or serialization, is the process of transforming the memory representation of a data sample in a specific language binding to a serialized representation suitable for transmission over the network. The opposite process, unmarshalling or deserialization, converts samples in the serialized format back into the memory representation.

In DDS, the memory representation of a data sample is determined by the language binding. The language binding specifies the programming-language mechanisms an application can use to construct and introspect data samples. For a giving programming language there can be multiple language bindings.

In DDS, the serialized network representation of a data sample is called Extended Common Data Representation (CDR), and there are two versions: Extended CDR (encoding version 1) (XCDR1) and Extended CDR (encoding version 2) (XCDR2). The representations are defined in the OMG Extensible and Dynamic Topic Types for DDS (DDS-XTYPES) specification.

The serialized network representation of a data sample always starts with a 2-byte header representing the encapsulation identifier. The encapsulation identifier encodes the following information:

The network endianness, which determines the order of the bytes for primitive values in the network buffer.
The data representation version: XCDR1 or XCDR2.
The type evolution kind (@mutable, @final, @appendable) described below.

Each publishing or subscribing endpoint (DataWriter or DataReader) is associated with a type that defines the structure for all data samples sent by the DataWriter or received by the DataReader. DDS-XTYPES describes the DDS Type System comprising the following types:

Primitive types: Boolean, Byte, Int8, UInt8, Int16, UInt16, Int32, UInt32, Int64, UInt64, Float32, Float64, Float128, Char8, Char16.
Strings: They can be strings of single-byte characters as well as of wide characters.
Constructed types: enumerations and bitmasks.
Alias types.
Collection types: Single and multi-dimensional arrays, variable-length sequences, variable-length maps.
Aggregated types: Structures and unions.
Annotation types: Define types that may be used to annotate other types.

Types can be described in multiple languages including XML (eXtensible Markup Language) and IDL (Interface Definition Language). For example, the following IDL snippet defines a type for a camera image topic called CameraImage. This type is a structure type that contains members that themselves have a type.

```
enum Format {
    RGB,
    HSV,
    YUV
};
@final
struct Resolution {
    long height;
    long width;
};
@final
struct Pixel {
    octet red;
    octet green;
    octet blue;
};
const long MAX_IMAGE_SIZE = 8294400;
@mutable
struct CameraImage {
    string<128> source;
    Format format;
    Resolution resolution;
    sequence<Pixel, MAX_IMAGE_SIZE> pixels;
};
```

In the example above, a data sample will represent a concrete camera image.

Types can have some of their members marked with annotations. There are four important annotations for a member that are relevant to this invention:

@key: Indicates that a member is part of the topic key (e.g. cameraId). A unique value for the key identifies a unique instance of the topic. Each data sample for a keyed topic represents the value of an instance at a specific point in time.
@optional: Indicates that a member value is optional. When the value is not set, it is not sent on the wire.
@external: Usually when a data sample is mapped in memory, it is implemented as a whole, meaning that, when feasible, its data members are placed next to each other in a single data space. This annotation forces the annotated member to be put elsewhere, in a dedicated place.

@max, @min, @range: Specifies the valid range for the value of a primitive member.

Data Evolution

The Extended CDR, used to send and receive data samples on the network, supports data type evolution. That is, it allows a data type to change in certain well-defined ways without breaking communication. Types can be marked with the following annotations to indicate the kind of evolution that they support:

@final: Types marked as final cannot evolve.

@appendable: Types marked as appendable can evolve by adding (or removing) members at the end.

@mutable: Types marked as mutable can evolve by reordering, adding, or removing members.

To support type evolution, the wire representation defines a set of headers that can be added at the beginning of an aggregated type (DHEADER), before each member within the aggregated type (EMHEADER), and at the end of an aggregated type (SENTINEL).

Among other information, the headers encode the size of the content they apply to. EMHEADERs also include a unique ID for a member in a mutable type. The SENTINEL header is only applicable to mutable types with Extended CDR (encoding version 1).

DHEADERs allow extending a type by adding members at the end. Types marked as appendable and mutable add a DHEADER at the beginning when the network representation is XCDR2. For example:

```
@appendable
struct Position2D {
   int32 x;
   int32 y;
};
// Position3D represents the next version of the Position type
@appendable
struct Position3D {
   int32 x;
   int32 y;
   int32 z;
};
```

Position2D wire format is shown in FIG. 1, and Position3D wire format is shown in FIG. 2.

EMHEADERs allow evolving a type by adding members in the middle or re-ordering existing members. The header is applicable to mutable types.

```
@mutable
struct Position2D {
   @id(1) int32 x;
   @id(2) int32 y;
};
// Position3D represents the next version of the Position type
@mutable
struct Position3D {
   @id(1) int32 x;
   @id(3) int32 z; // z was added in the middle
   @id(2) int32 y;
};
```

Position2D wire format is shown in FIG. 3 and Position3D wire format is shown in FIG. 4.

Middleware Latency

A normal DDS application makes at least four copies in the process of delivering a data sample from the publishing application to the subscribing application (including the serialization and deserialization). FIG. 5 shows the copies that a middleware would make in order to send and receive a data sample over two possible transports: UDP and shared memory.

Copy 1: serialization into a network buffer.

Copy 2: reception.

Copy 3: reassembly.

Copy 4: deserialization into the application object, according to its native memory representation.

Data serialization and deserialization becomes an important source of high latency in applications that send and receive very large data samples. Sample latency has three components: middleware, copy, and transport (FIG. 6). When a middleware is used to send small data samples, such as temperature readings, the weight of the copy component in the total sample latency is small. But when samples are large, the weight of the copy component becomes considerable (FIG. 7). Therefore, reducing the number of copies made by the middleware or network infrastructure when publishing and receiving large samples becomes critical. Reducing these copies is the focus of this invention.

SUMMARY OF THE INVENTION

Definitions

OMG: Object Management Group.

RTPS protocol: Real-Time Publish Subscribe Protocol.

DDS: Data Distribution Service.

DDS Type (or Type): Defines a common structure for all data samples of a DDS Topic. The type of a data sample can be a union or a structure.

Data sample: A unique value for a DDS Type.

Structure: A Structured type is a named type composed of a list of members.

Union: A Union type is a named type that contains a discriminator member and a list of value members from which at most one can be active based on the discriminator value.

Mutable types: Types that can evolve by reordering, adding, or removing members.

Annotation: Metadata associated with a DDS Type.

Fixed-size DDS Type: A type made of the following kinds of data members: primitive, arrays of primitive types or fixed-size types, other fixed-size types.

Variable-size DDS Type: A type containing sequences and/or strings.

Memory representation: Represents how a sample is layout in memory and it is determined by the language binding.

Language binding: Specifies the programming-language mechanisms an application can use to construct and introspect data samples. For a given programming language there can be multiple language bindings.

Plain language binding: The native language binding for a programming language.

Plain Memory Representation: The memory representation for the plain language binding.

Network representation: Represents how a sample is transmitted on the network. In DDS, the serialized network representation of a data sample is called Extended Common Data Representation (CDR), and there are two versions: Extended CDR (encoding version 1) (XCDR1) and Extended CDR (encoding version 2) (XCDR2). The representations are defined in the OMG Extensible and Dynamic Topic Types for DDS (DDS-XTYPES) specification.

DataWriter: An entity that publishes data samples.

DataReader: An entity that receives data samples.

Embodiments of the invention are methods for reducing the number of copies required to distribute a data sample in a system using Object Management Group (OMG) Data Distribution Service (DDS), while allowing an efficient access to the data samples.

In a DDS application the memory representation for data samples is different than the network representation. Because of that, sending a sample from a DataWriter to a DataReader will require two marshalling copies (FIG. 8):

- One copy to convert from memory representation to network representation. This first conversion operation is called serialization.
- One copy to convert from network representation to memory representation. This second conversion operation is called deserialization.

The memory representation of the data samples is manipulated using a language binding application programming interface (API). Plain language APIs in the native programming languages (C, C++, etc.) are very efficient accessing the memory representation.

Embodiments of the invention remove the serialization and deserialization copies by making the memory representation equal to the network representation and by generating a new language binding API called FlatData language binding that can be used to manipulate the new memory representation of the data samples (FIG. 9).

However, the problem with the FlatData language binding API is that it is not as efficient accessing the memory representation as the plain language binding API in FIG. 8.

To mitigate this problem, embodiments in this invention enable the identification of portions of the FlatData memory representation that are equal in the plain memory representation. For these portions, the invention will allow you to access the FlatData memory representation using the plain language binding (FIG. 10).

In one embodiment, the invention is defined as a method for reducing a number of copies required to send a data sample with a Data Distribution Service (DDS) type in a system using an Object Management Group (OMG) Data Distribution Service (DDS) and a Real-Time Publish Subscribe (RTPS) protocol. In this method there is a first application for creating a DataWriter publishing data samples, and a second application for creating a DataReader subscribing to the data samples. A network representation of the data samples for the DDS type is defined, which can be an Extended CDR encoding version 1 (XCDR1) or an Extended CDR encoding version 2 (XCDR2). Key to the invention is the definition/creation of a memory representation of the data samples for the DDS type that is equal to the network representation of the data samples for the DDS type. With this key step, the method then further allows for the sending of the data samples to the DataReader without making a serialization copy of the data samples, and for the receiving the data samples from the DataWriter without making a deserialization copy of the data samples.

In this method, the DataWriter is borrowing the memory representation of the data samples to avoid making a copy, and the DataWriter notifies the first application that no further borrowing is needed once the data samples have been sent and acknowledged by the DataReader. In this method, the DataReader is borrowing the network representation of the data samples to avoid making a copy.

In another embodiment, the invention is defined as a method for accessing to a network representation of data samples with a Data Distribution Service (DDS) type in a system using an Object Management Group (OMG) Data Distribution Service (DDS) and a Real-Time Publish Subscribe (RTPS) protocol. In this method there is a network representation of the data samples for the DDS type. The network representation is an Extended CDR encoding version 1 (XCDR1) or an Extended CDR encoding version 2 (XCDR2). Key to the invention is the definition/creation of a first memory representation of the data samples for the DDS type is defined equal to the network representation for the DDS type, as well as the definition/creation of a first language binding application for manipulating the first memory representation by providing an Application Programming Interface (API). Manipulating could be constructing and introspecting of the memory representation. Noted in this method are further key aspects such as that the first memory representation can be independent of the programming language, the DDS type can be marked with an annotation to select the first language binding application, the first language binding application can access the first memory representation of the data samples for fixed-size DDS types using Offsets (which can be generated at run-time or by a Code Generation application), and/or the first language binding application accesses the memory representation of the data samples for variable-size DDS types using Builders (the Builders for mutable DDS types can use members headers (EMHEADER) to efficiently move through the first memory representation).

This method further has a second plain memory representation of the data samples for the DDS type, and a second plain language binding for manipulating the second plain memory representation. In one example, portions of the first memory representation that are equal in the second plain memory representation can be accessed using the second plain language binding to improve performance.

Embodiments of this invention can be in the form of a method, system, computer-implemented method executable by computer hardware, computer code where methods steps are executable by a computer processor, distributed over the Internet where the system or method steps are executed by a computer server, or the like.

The embodiments of this invention lead to a significant reduction of the communication latency when sending large data samples in the order of MB between applications using Object Management Group (OMG) Data Distribution Service (DDS).

BRIEF DESCRIPTION OF THE DRAWINGS

FIG. 1 shows a network representation for an @appendable Position2D including DHEADER according to an exemplary embodiment of the invention.

FIG. 2 shows a network representation for an @appendable Position3D including DHEADER according to an exemplary embodiment of the invention.

FIG. 3 shows a network representation for a @mutable Position2D including EMHEADER per member according to an exemplary embodiment of the invention.

FIG. 4 shows a network representation for a @mutable Position3D including EMHEADER per member according to an exemplary embodiment of the invention.

DETAILED DESCRIPTION

Flat-Data Language Binding

Flat-Data Language Binding (FDLB) according to this invention is a language binding in which the memory representation of a sample matches the wire representation (XCDR2 or XCDR1). Therefore, data samples can be directly published from a DataWriter and received by one or more DataReaders without the cost of serialization. A DataWriter doesn't need to serialize a data sample to publish it, and a DataReader doesn't need to deserialize it.

Since FDLB uses XCDR as its memory representation (in this description it is assumed that it uses XCDR2, but it could also use XCDR1), samples published fully interoperate with other DDS applications and tools that don't use FDLB. Similarly, a DataReader can use FDLB to receive samples that were published by DDS applications that didn't use it.

Unlike a typical plain language binding in which, for example, an IDL struct maps to a C++ class with data members, with FDLB the IDL struct maps to types with a memory buffer. FDLB provides the means for applications to create and manipulate the data samples.

Figure 5:
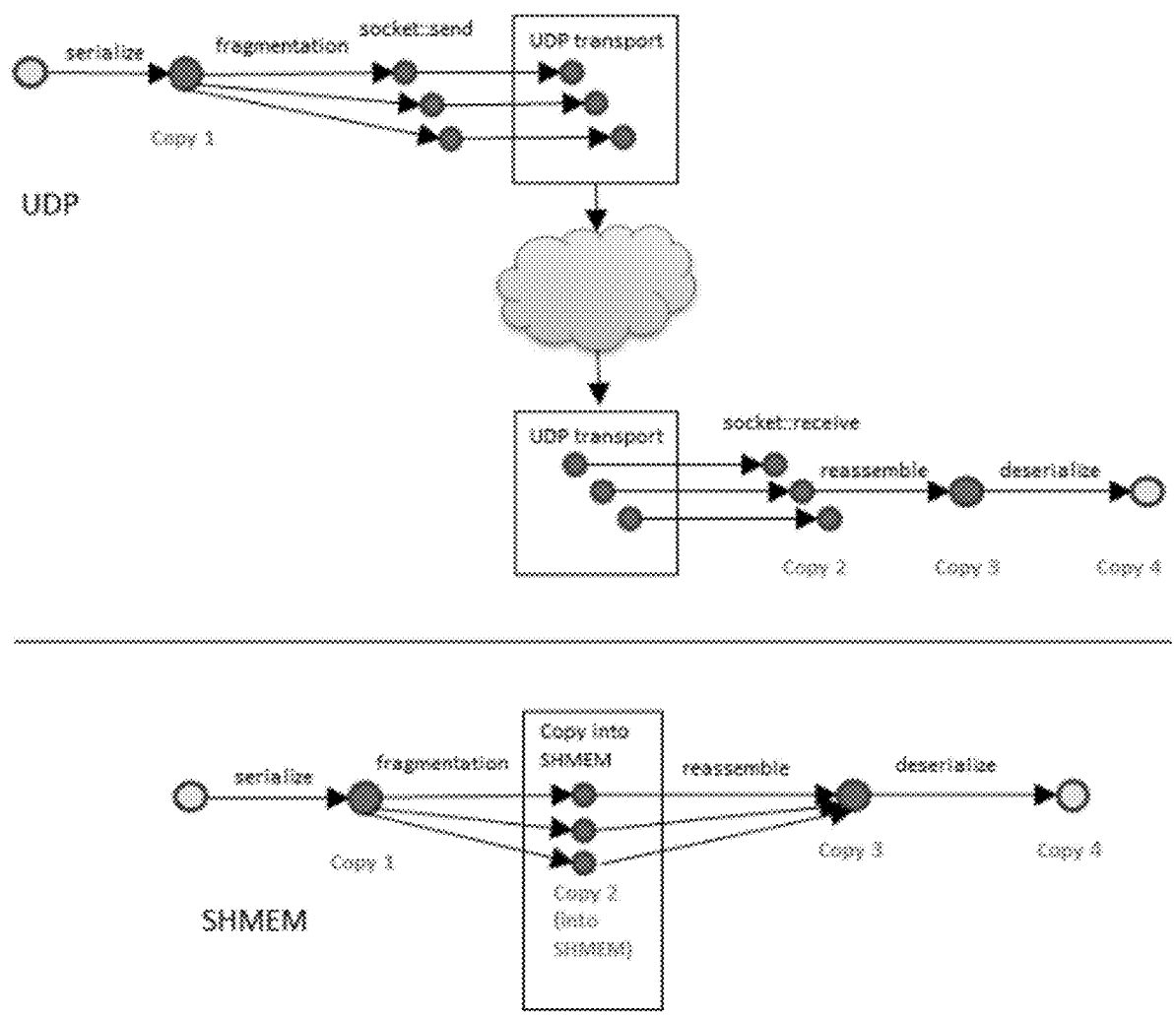
FIG. 5 shows according to an exemplary embodiment of the invention a number of copies in normal DDS system.
Figure 6:
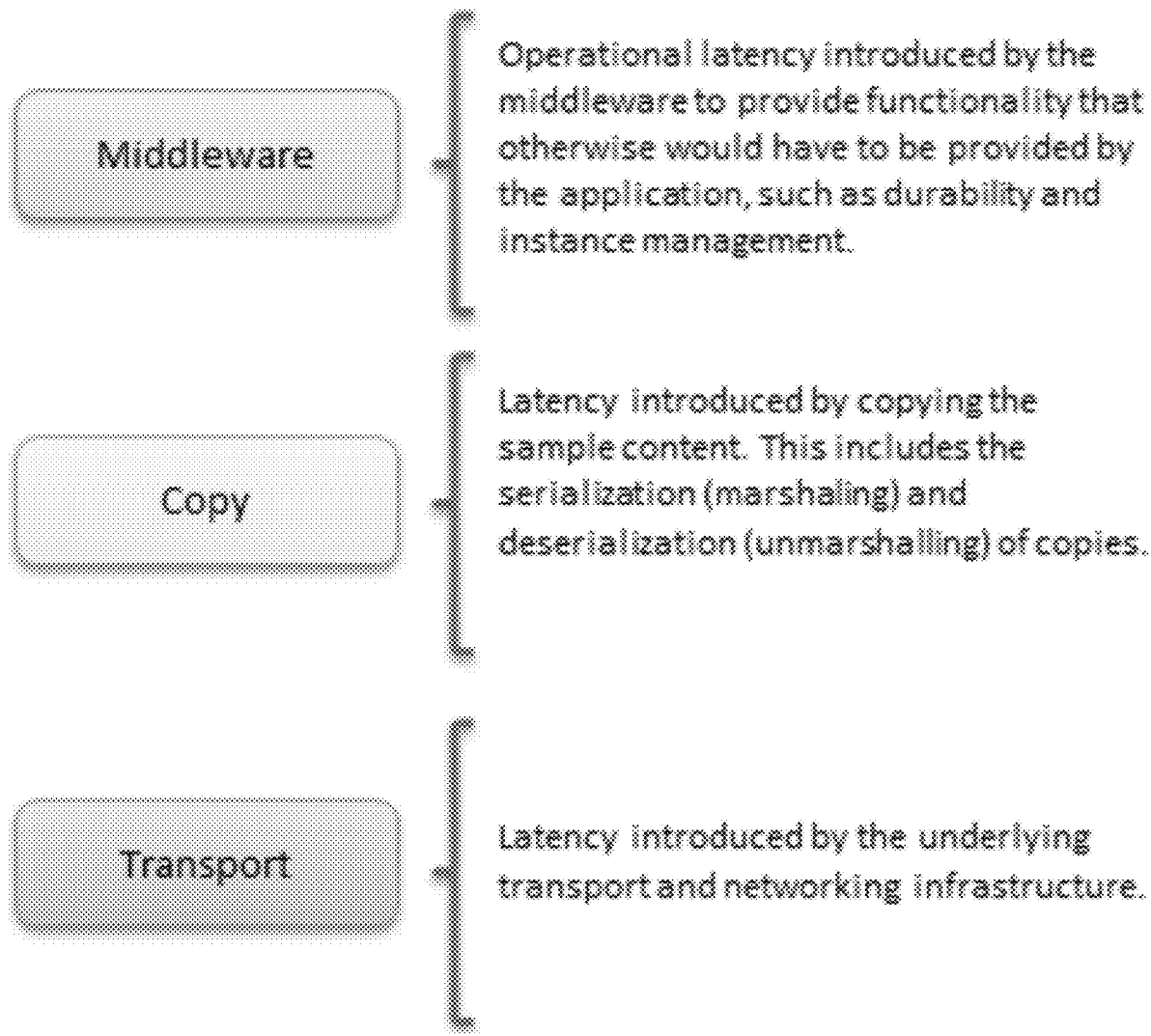
FIG. 6 shows according to an exemplary embodiment of the invention basic components of latency.
Figure 7:
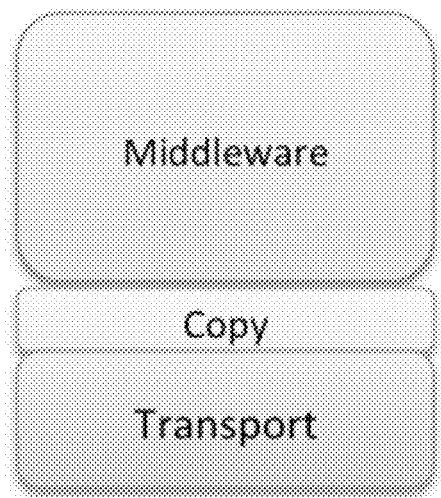
FIG. 7 shows according to an exemplary embodiment of the invention a copy component compared (small and large sample latency).
Figure 7:
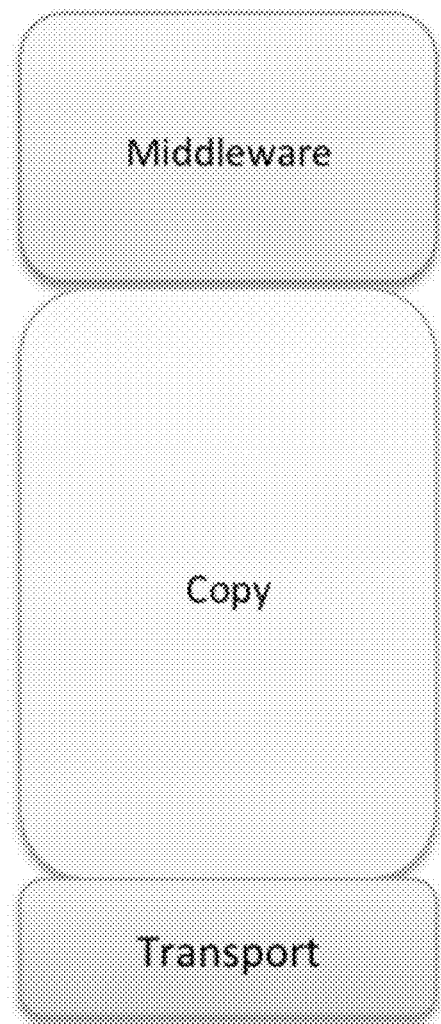
Figure 8:
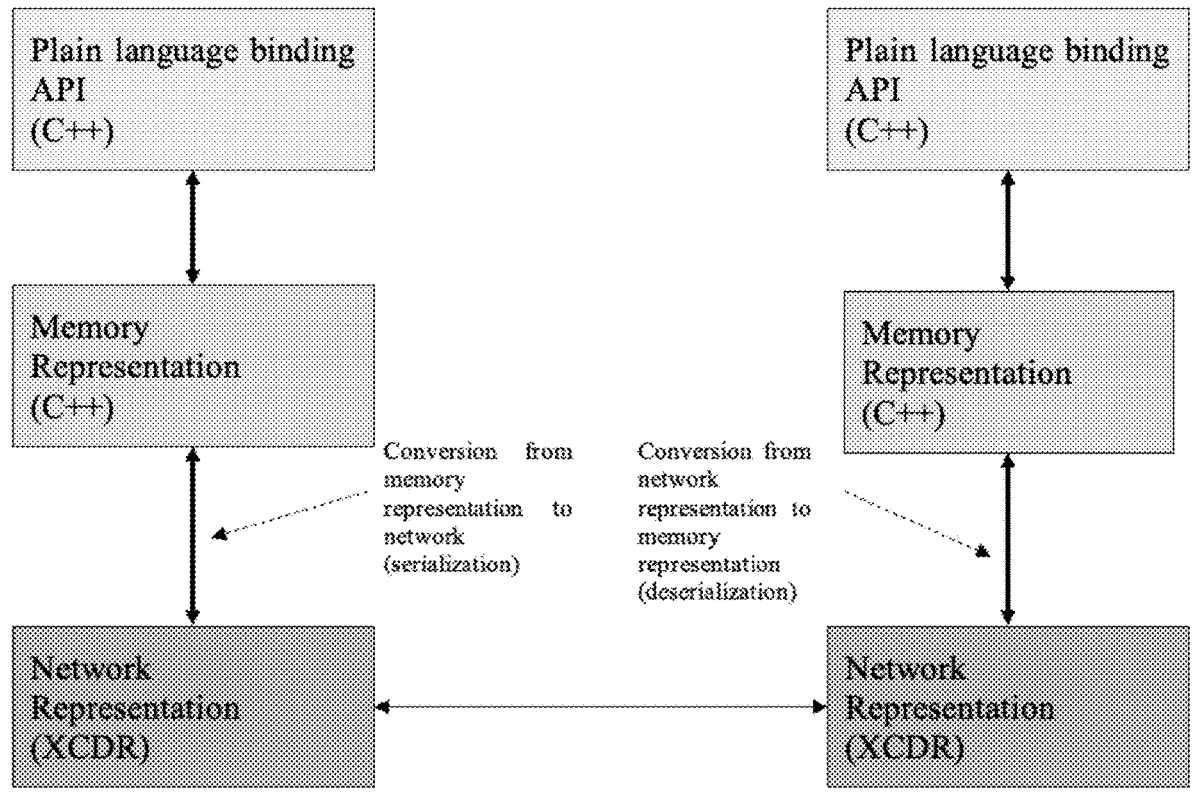
FIG. 8 shows according to an exemplary embodiment of the invention serialization/deserialization copies with plain memory representation.
Figure 9:
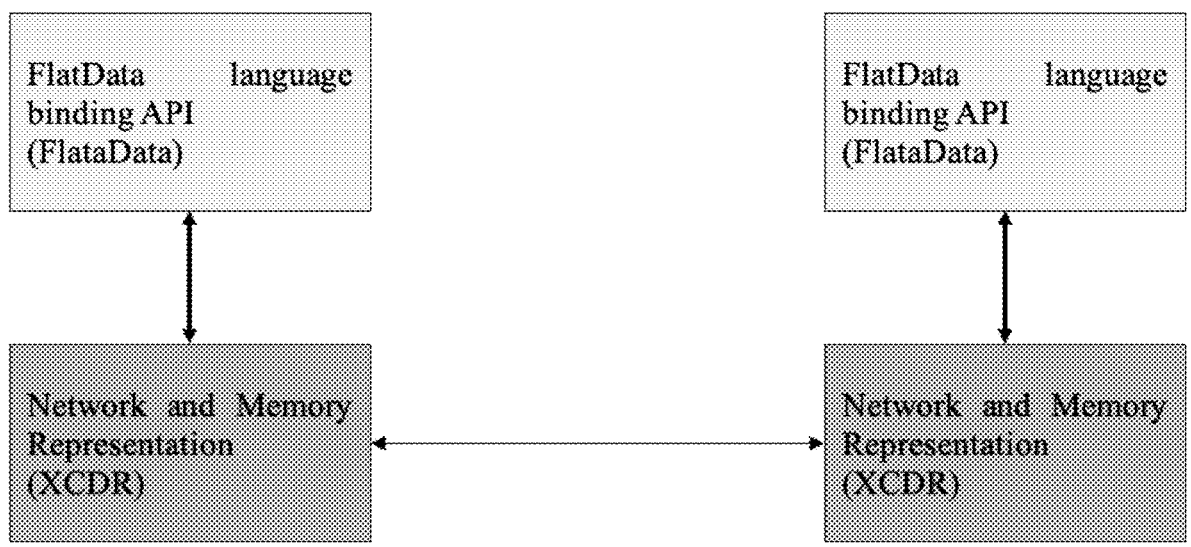
FIG. 9 shows according to an exemplary embodiment of the invention FlatData language binding and memory representation.
Figure 10:
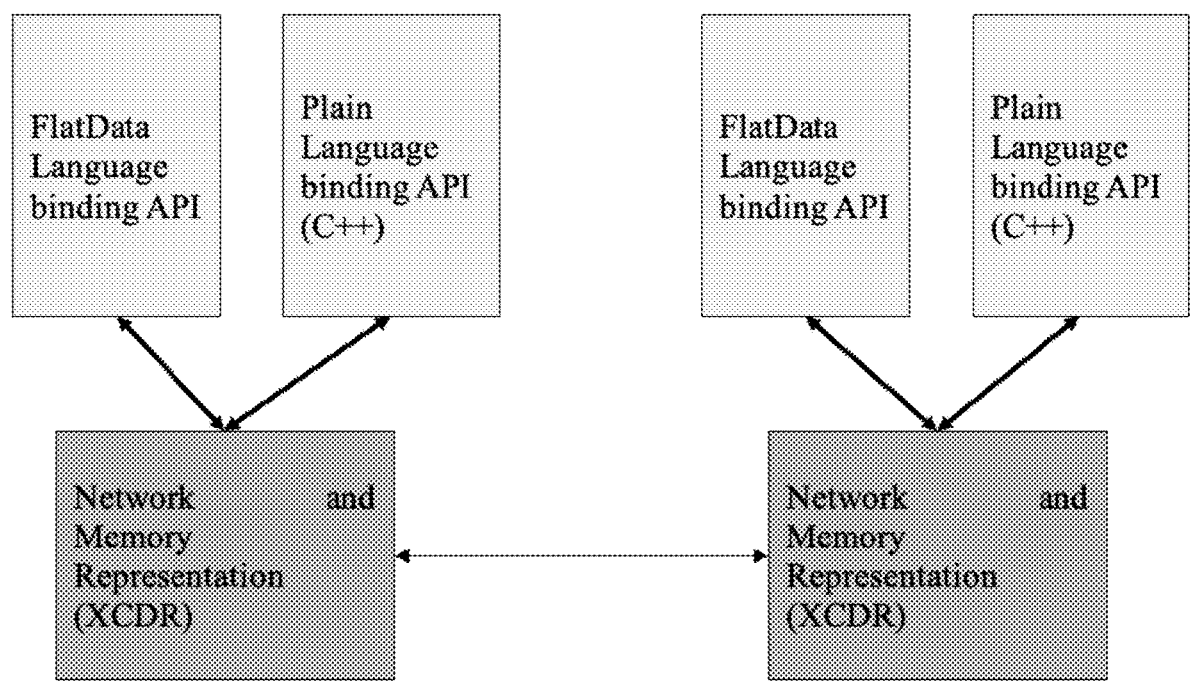
FIG. 10 shows according to an exemplary embodiment of the invention efficient access to the FlatData memory representation using different language bindings.
Figure 11:
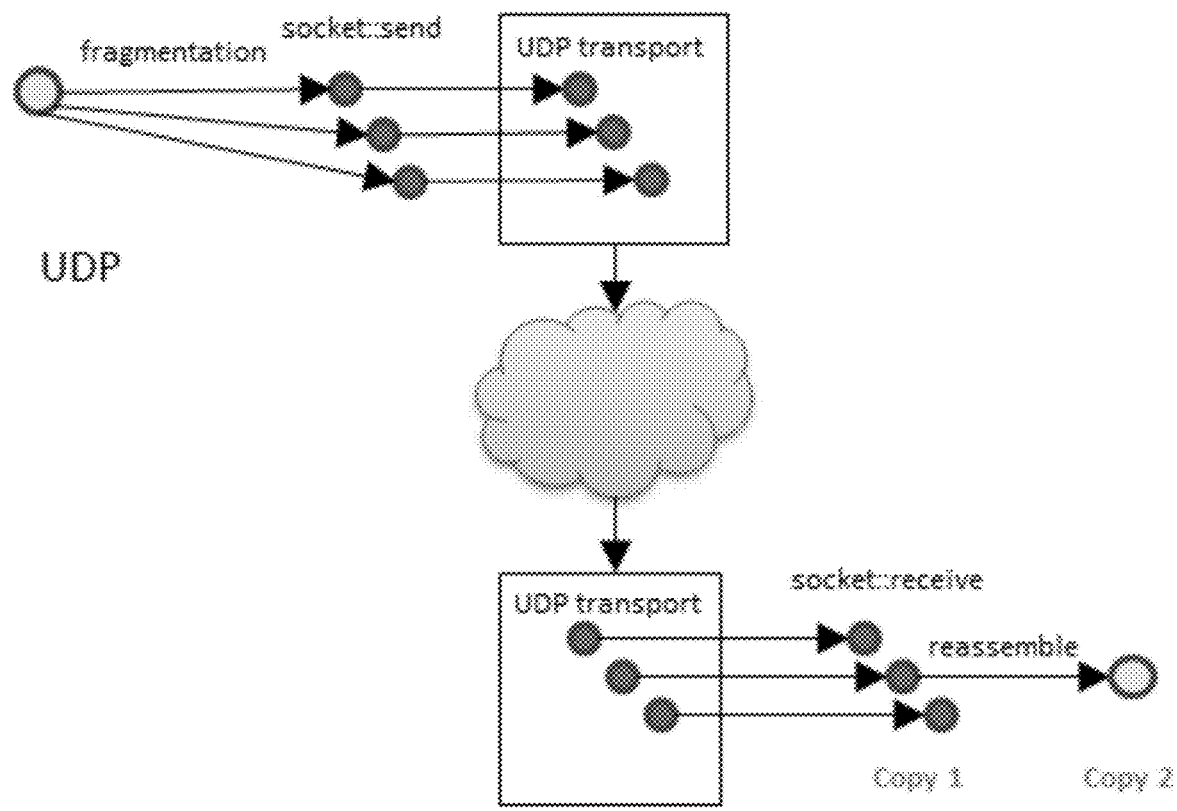
FIG. 11 shows according to an exemplary embodiment of the invention a number of copies using Flat-Data Language Binding.
Figure 11:
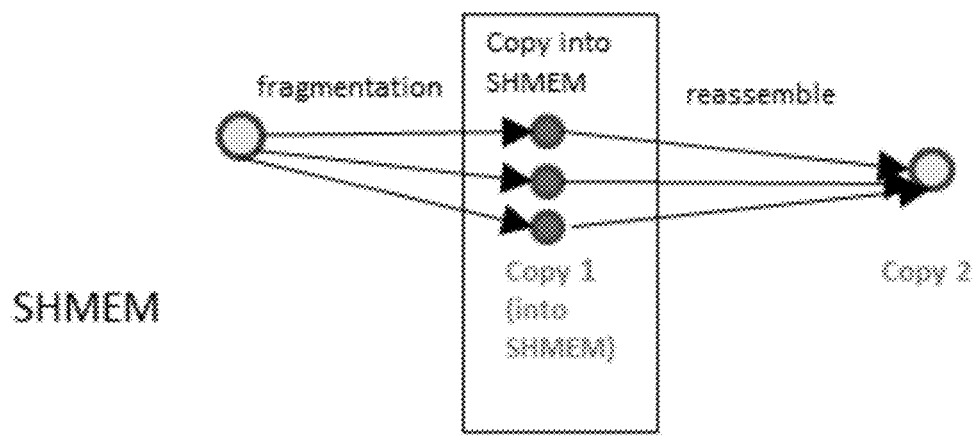

When using FDLB, Copy 1 and Copy 4 as shown in FIG. 11 are removed for both UDP and shared-memory communications.

FDLB offers the following benefits:

Reduced number of copies: from four to two for transports such as shared memory and UDP (FIG. 11), because there is no need to serialize or deserialize a sample.

Because of reduced data copying, DataReaders and DataWriters consume less memory and reduce their CPU load.

Improved transmission latency for large data samples.

How to Select FDLB in IDL

Using FDLB for an IDL type requires annotating it with the annotation @language_binding(FLAT_DATA).

```
enum Format: {
    RGB,
    HSV,
    YUV
};
@final
@language_binding(FLAT_DATA)
struct Resolution {
    long height;
    long width;
};
@final
@language_binding(FLAT_DATA)
struct Pixel {
    octet red;
    octet green;
    octet blue;
};
const long MAX_IMAGE_SIZE = 8294400;
@mutable
@language_binding(FLAT_DATA)
struct CameraImage {
    string<128> source;
    Format format;
    Resolution resolution;
    sequence<Pixel, MAX_IMAGE_SIZE> pixels;
};
```

Language Binding and Programming Interface

With FDLB, the memory representation for samples of a type is equal to the wire representation (according to XCDR2). That is, the data sample is in its serialized format at all times. To facilitate accessing and setting the sample content, an API provides the types and operations to create and read these data samples.

A generic API provides helper types to manipulate any data sample. Complementing this generic API, an application (Code Generator) generates additional types for user-defined IDL structs and unions.

The aforementioned generic and generated types together make up FDLB. These types fall into three categories: Samples, Offsets, and Builders.

Samples contain the data buffer, Offsets allow manipulating the data in a sample, and Builders allow creating variable-size samples.

Samples

Figure 12:
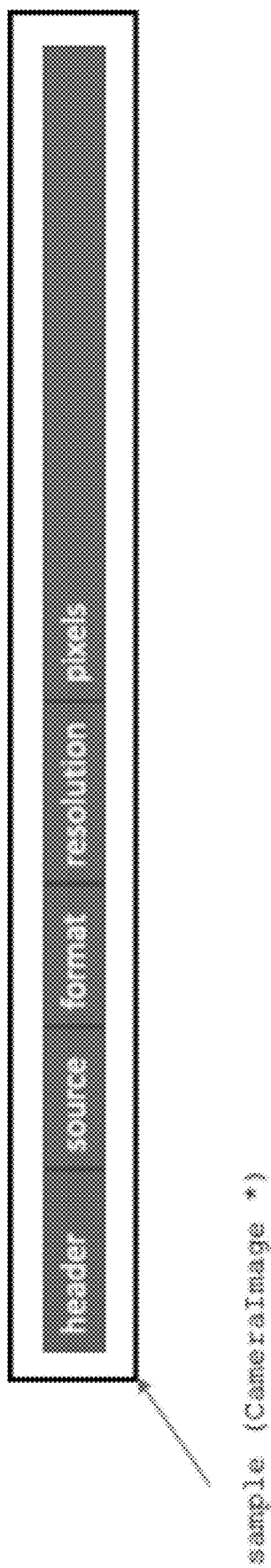
FIG. 12 shows according to an exemplary embodiment of the invention an example representation of a sample as a single buffer.

Flat-Data Samples contain a buffer holding the wire representation of the data. In the code generated for the previous IDL, a sample of the type CameraImage contains this buffer. This is the top-level object that can be written or read (FIG. 12).

Figure 13:
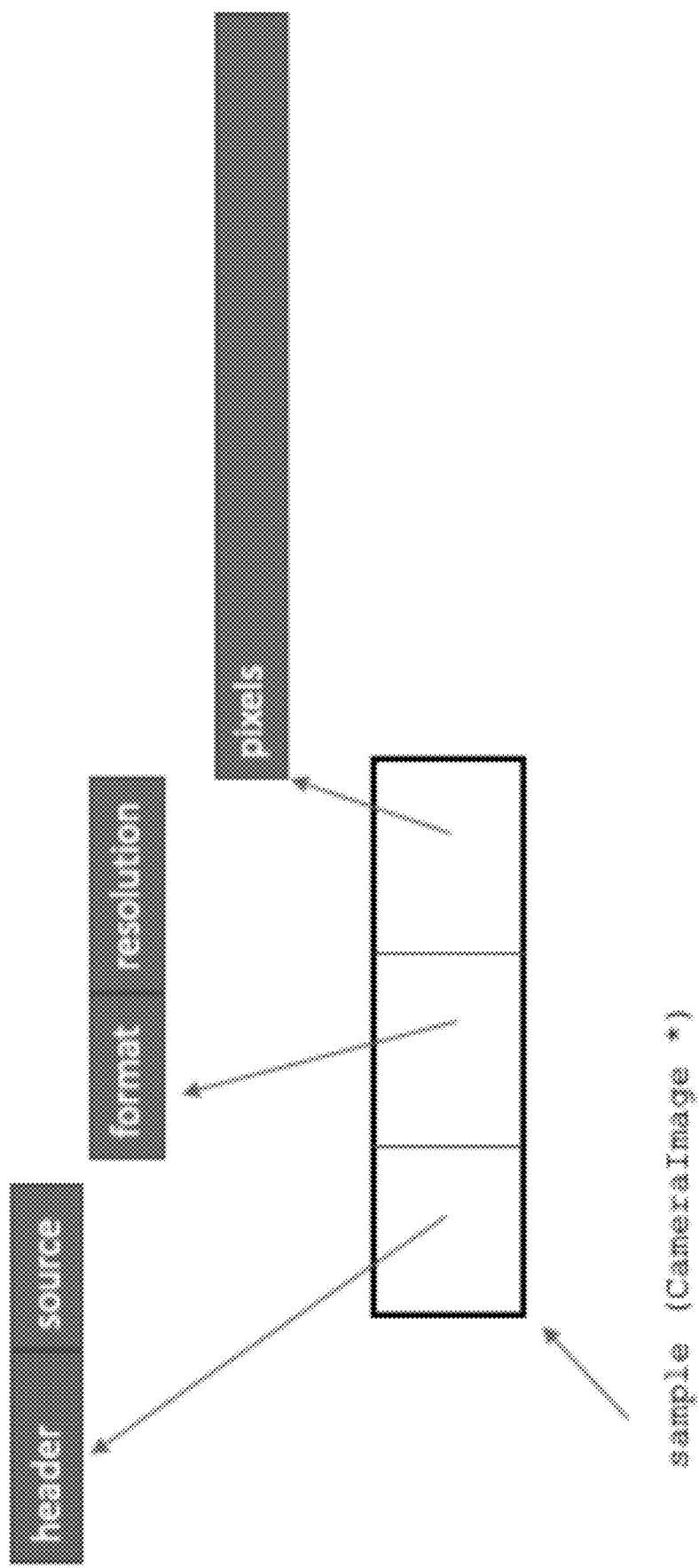
FIG. 13 shows according to an exemplary embodiment of the invention an example representation of a sample as an array of buffers.

The header corresponds to meta-information added to each sample in conformity with the XCDR2 format. A sample may be also represented as an array of buffers, which are concatenated sequentially to make up the complete sample (FIG. 13). This concatenation allows applications to provide the content of different data members as external sources, without copying them into a single buffer. For example, a surveillance application may obtain the sequence of pixels from a camera and directly include it in the final sample (along with the other data members, source, format, and resolution), without copying the contents into a contiguous buffer. External members are marked with the @external annotation in IDL. Standard I/O interfaces in operating systems (e.g. sockets) usually provide a way to read or write data to multiple buffers, which are separated in memory (scatter-gather). This model is aligned with the sample representation described above.

Offsets

Figure 14:
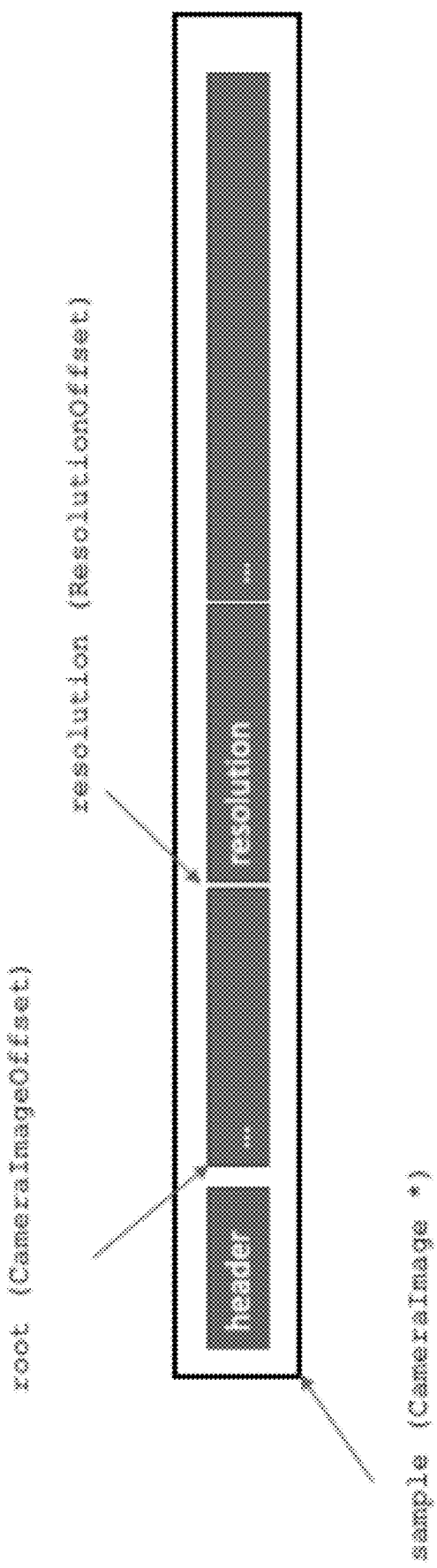
FIG. 14 shows according to an exemplary embodiment of the invention an example Offsets pointing to members of a data sample.

Offset types allow accessing the data in a Sample (FIG. 14). An Offset represents the type of a member and its location in the buffer. An Offset has some of the properties of an "iterator," a light-weight object that points to the data, but doesn't own it. Copying an Offset copies the "iterator," not the data it points to.

The location can be calculated at runtime, or in some cases pre-calculated.

There are two kinds of Offset types: generated and generic.

A generated Offset allows accessing a user-defined struct or union value (CameraImageOffset, PixelOffset). It provides accessors to directly get or set primitive member values, and one getter for each non-primitive member to retrieve its corresponding Offset.

These are the Offset types generated for the CameraImage struct type in C++:

```
class CameraImageConstOffset : public rti::flat::MutableOffset {
public:
    const rti::flat::StringOffset source( ) const;
    Format format( ) const;
    Resolution::ConstOffset resolution( ) const;
    rti::flat::SequenceOffset<Pixel::ConstOffset> pixels( ) const;
};
class CameraImageOffset : public rti::flat::MutableOffset {
public:
    typedef CameraImageConstOffset ConstOffset;
    // Const accessors
    const rti::flat::StringOffset source( ) const;
    Format format( ) const;
    Resolution::ConstOffset resolution( ) const;
    rti::flat::SequenceOffset<Pixel::ConstOffset> pixels( ) const;
    // Modifiers
    rti::flat::StringOffset source( );
    bool format(Format value);
    Resolution::Offset resolution( );
    rti::flat::SequenceOffset<Pixel::Offset> pixels( );
};
```

Each named Offset has a corresponding read-only version (CameraImageConstOffset). This is analogous to a read-only iterator (e.g., std::vector<T>::const_iterator and std::vector<T>::iterator).

Generic Offsets are Offsets to arrays, sequences, strings, and other IDL built-in types. They provide access to their elements. Primitive elements can be accessed directly; non-primitive elements are accessed through Offsets for their types.

For details on all the Offset types and their interface, see the Appendix B, API Reference, in U.S. Provisional Patent Application 62/823,527 filed Mar. 25, 2019 which is incorporated by reference.

A function in the Sample type (CameraImage::root( )) provides the Offset to the top-level type (CameraImageOffset). If the sample is read-only (const), root( ) returns a read-only offset (CameraImageConstOffset).

Efficient Offset Calculation (Final Versus Mutable Encapsulation)

Efficient access to the data members of a Flat-Data Sample is limited by its encapsulation, indicated by the encapsulation identifier, that is, by the format of the serialized data. The encapsulation is determined by the type's extensibility: final, extensible, and mutable, as described supra in Data Evolution.

The algorithm to find the Offset of a member M for each encapsulation is as follows. For mutable types (FIG. 15), it is possible to use each member's EMHEADER to efficiently skip members until M's member ID (M.id) is found:

```
find_offset(M) {
    offset = 0
    (id, size) = deserialize_emheader(offset)
    while (id != M.id and offset < end_of_buffer) {
        offset = skip(offset, size)
        (id, size) = deserialize_emheader(offset)
    }
    return offset
}
```

Figure 15:
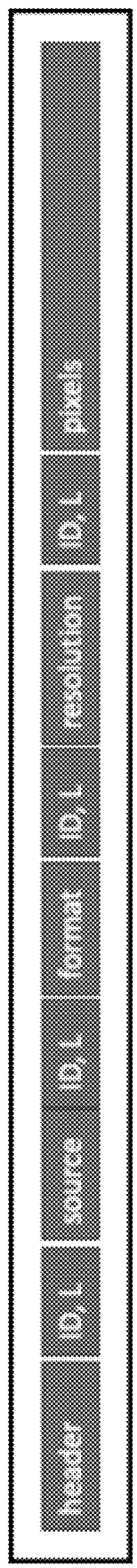
FIG. 15 shows according to an exemplary embodiment of the invention an example representation of a data sample of a mutable type.

For example, to find the offset to the member pixels in CameraImage (FIG. 15). This algorithm will look at the EMHEADER of source, format and resolution, each containing the corresponding member ID and its value size (L in the figure). It will use that information to skip the bytes containing source, format, and resolution until it finds pixels's ID.

For final and appendable types, skipping the members that precede M (m1, m2, . . . , mi, M) may require fully deserializing them, since these types do not use EMHEADERs. Assuming the types for (m1, m2, . . . , mi) are (t1, t2, . . . , ti), the algorithm is:

```
find_offset_M( ) {
    offset = skip_t1(0)
    offset = skip_t2(offset)
    . . .
    offset = skip_ti(offset)
    return offset
}
```

Figure 16:
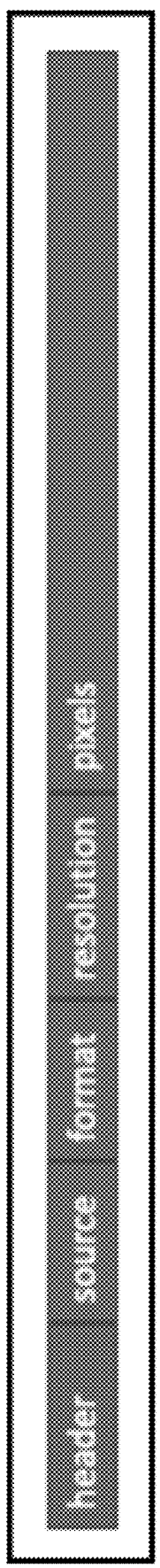
FIG. 16 shows according to an exemplary embodiment of the invention an example representation of a sample of a final type.

This algorithm is very inefficient: it requires deserializing part of the data sample for each member access. Finding the offset to pixels in CameraImage would require skipping the previous members: source, format, and resolution (FIG. 16).

Since the goal of FDLB is to avoid any serialization/deserialization, this algorithm is not acceptable since it would introduce an order of execution O(n) to find a member offset.

However, if we restrict final or appendable types so that they're fixed-sized, it is possible to optimize this process. Fixed-size types are those such that all samples of that type produce a serialized buffer of the same size where each member value is always in the same position. Such types are made of the following kinds of data members:

primitive types.
arrays of primitive types or fixed-size types.
other fixed-size types.

Given a final or appendable fixed-size type, it is possible to calculate ahead of time the relative offset in bytes to each member m: m.offset. This calculation can be done by a Code Generator application. This calculation makes the algorithm to access a member M trivial—with O(1) complexity:

```
find_offset(M) {
    return M.offset
}
```

Due to these reasons and to achieve good performance, FDLB requires final and appendable types to be fixed-size. Any IDL constructs are allowed in mutable types.

Optimal Access to the Data (Flat-to-Plain Cast)

Under certain circumstances, the memory representation of a buffer of serialized XCDR2 data is identical to the memory representation of an instance of the type in the plain language binding (such as the plain C++ language binding). When that's the case, a pointer to the bytes in the XCDR2 buffer can be cast to a pointer of the C++ type.

In C++, the conditions for that to be possible are the following:

The endianness in the serialized buffer is equal to the endianness of the memory representation The IDL type doesn't inherit from another type, The IDL type is final and fixed-size, as described in the previous section.

None of the IDL members are marked with any of the following annotations: @optional, or @external, The size of the primitive types used in the IDL type is the same in XCDR2 as well as C++. This is normally the case except in some platforms where the C++ type bool may have a 4-byte size, instead of the usual 1-byte.

For any possible initial alignment, the type doesn't require padding in its C++ representation or in its XCDR2 representation.

For any possible initial alignment, an array of the type doesn't require any padding between its elements.

Similar conditions can be defined for other plain language bindings. For the C++ plain language binding, the meta-type plain_type associates a given Offset to its equivalent plain C++ type. That is, given the Flat-Data Sample type T, flat_data_traits<T>::plain_type is the equivalent plain type.

The function is_cpp_compatible provides a way to check if the data pointed to by an Offset meets the cast requirements. When it does, the function plain_cast successfully makes the cast, returning a pointer to the plain_type.

Additionally, an IDL annotation, @ensure_plain_compatibility, declares the intention that a type annotated with @language_binding(FLAT_DATA) must meet the plain_cast requirements. A Code Generator application will fail to generate code for this type if these requirements are not met and may suggest how to redefine the type to achieve them.

Whenever possible, accessing the data through the equivalent plain-language-binding type is more efficient than using the related Offset, especially if the data is a large sequence of array.

Builders

To create variable-size (mutable) data samples, applications use Builders. A Builder type provides the interface to create a mutable sample member by member. Once all the desired member values for a sample have been added, the Builder is "finished," returning the built sample, which can be published with a DataWriter.

A Builder owns the buffer of the sample being created. The Builder interface provides the application with the means to add member values to the sample, and to complete the construction process, returning the sample to the application.

Builders provide three basic functions:

add inserts a member value of a final or appendable type, returning an Offset to it.

build provides another Builder to create a member value of a mutable type.

finish and finish_sample end the construction of a member value or a sample, respectively.

Generic Builders can create samples of any type; generated Builders for user-defined types restrict the member values that can be added to those defined in the IDL type.

Figure 17:
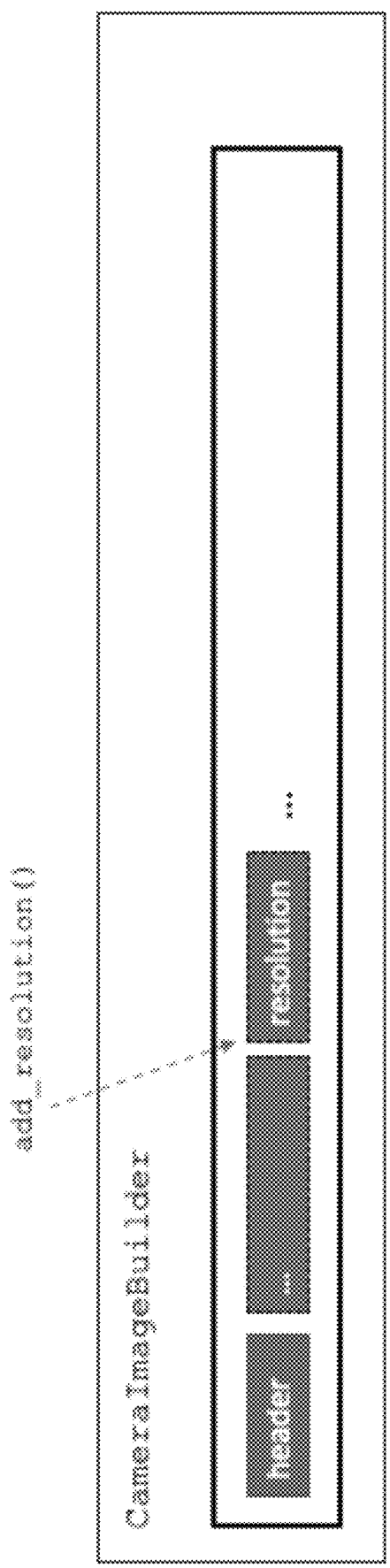
FIG. 17 shows according to an exemplary embodiment of the invention an example of addition of a member value using a Builder.

Instead of generic add or build operations, generated builders provide a named add or build operation for each member in the IDL type (FIG. 17):

If the member is of a final type: add_<member>

If the member is of a mutable type: build_<member>

This is the Builder type generated for the CameraImage IDL struct:

```
class CameraImageBuilder : public rti::flat::AggregationBuilder {
public:
    typedef CameraImageOffset Offset;
    Offset finish( );
    CameraImage * finish_sample( );
    rti::flat::StringBuilder build_source( );
    bool add_format(Format value);
    Resolution::Offset add_resolution( );
    rti::flat::FinalSequenceBuilder<Pixel::Offset> build_pixels( );
};
```

Builders provide several advantages that a Plain language binding cannot provide:

Members can be added in any order to the Flat-Data Sample, and therefore they are sent in that order on the wire. With plain language binding members are serialized in the order in which they are declared in IDL.

Any members (except @key members) can be omitted from the Flat-Data Sample. Therefore, even non-@optional IDL members can be omitted, saving bandwidth.

DataWriter/DataReader Copy Optimization

When the write( ) operation for a DataWriter for an FDLB type is called, the DataWriter, aware of the fact that the user-provided sample itself can be directly sent on the wire, can optimize the operation. The DataWriter can avoid serializing the sample and copying it into the sending queue.

The DataWriter, however, may keep the sample until it has been successfully delivered according to the RTPS reliability protocol. Until that point, the sample is "loaned," since it wasn't copied. The application yields ownership of the sample when it calls write( ).

The DataWriter provides a mechanism to notify the application when the sample is no longer loaned and is owned by the application again. The application can use the on_sample_removed callback in the DataWriter listener to monitor the sample status. This listener callback provides information about what sample is removed from the sending queue.

To simplify this process, the DataWriter may provide a mechanism for the application to obtain loaned data samples on demand, which can only be used to write once. This function, get_loan( ), returns a data sample containing a buffer large enough to accommodate any sample of the DataWriter's type. This buffer belongs to a DataWriter-owned pool. The application can manipulate this sample until it calls write( ). After that, the application needs to call get_loan( ) again to write another sample. This mechanism doesn't require monitoring the DataWriter's sample status.

An additional function, build_data( ), returns a Builder for the DataWriter's type that allows building a variable-size data sample on memory, loaned from the DataWriter, the same way get_loan( ) does.

On the subscribing side, once the received fragments are reassembled, a DataReader for an FDLB type allows access to the serialized sample in the reassembly buffer through the take( ) operation. Using this loaned buffer from the DataReader in the application prevents the copy otherwise needed during the deserialization process.

For the access to DataReader samples to be efficient, the endianness of the publishing application needs to be the same as the endianness of the subscribing application.

Usage

Creating a Flat-Data Sample for a Final Type in C++

This section shows how to create a sample for the final type Pixel. The following section shows how to create a sample for the mutable type CameraImage.

Samples for final Flat-Data types are created directly with a single call to the DataWriter function get_loan. The DataWriter manages this sample and will return it to a pool at some point after the sample is written.

Pixel *pixel_sample=writer.extensions( ).get_loan( );

pixel_sample contains the buffer that can be written. To set its values, the root function locates the position of the top-level type:

PixelOffset pixel=pixel_sample->root( );

The root ( ) function returns PixelOffset, which points to the position where the data begins. The following setters allow setting the member values:

pixel.red(10);
pixel.green(20);
pixel.blue(30);

Creating a Flat-Data Sample for a Mutable Type in C++

Samples for mutable types are created using Builders. To obtain a CameraImageBuilder to build a CameraImage sample, use the function build_data:

CameraImageBuilder image_builder=rti::flat::build_data (writer);

This function loans the memory necessary to create a CameraImage sample from the DataWriter and provides a CameraImageBuilder to populate it. The Builder functions set the sample's members (in any order). Non-key members can be omitted, even when they are not optional. These Builder functions work on a pre-allocated buffer; they do not allocate any additional memory.

As a primitive member, the function add_format directly adds the member and sets its value:

image_builder.add_format(Format::RGB);

The function add_resolution adds the member resolution (its type being final type), and provides the Offset that allows setting its values:

ResolutionOffset resolution=image_builder.add_resolution( );
  resolution.height(100);
  resolution.width(200);

To build the string member source, the function build_source returns a StringBuilder. This builder provides set_string. The function finish completes the construction of the member and renders source_builder invalid.

auto source_builder=image_builder.build_source( );
source_builder.set_string("CAM-1");
source_builder.finish( );

The function build_pixels provides a PixelBuilder to create the sequence members:

auto pixels_builder=image_builder.build_pixels( );

There are two ways to populate this member.

Method 1: add and initialize each element:

```
for (int i = 0; i < 20000; i++) {
    PixelOffset pixel = pixels_builder.add_next( );
    pixel.red(i % 256);
    pixel.green((i + 1) % 256);
    pixel.blue((i + 2) % 256);
}
pixels_builder.finish( );
```

Builders for sequences with elements of a final type provide the function add_next to add the elements. When the element type is mutable, the sequence (and array) Builder provides the function build_next, which provides a Builder for each element.

Method 2: cast the elements in the sequence to the equivalent C++ plain type. This method only works for types that meet the conditions described supra in Optimal access to the data (flat-to-plain cast).

Method 2 is more efficient. The Builder function add_n adds 20000 elements at once, leaving them uninitialized. The finish( ) function returns the Offset to the member, which can be cast to the equivalent plain C++ type:

```
pixels_builder.add_n(20000);
auto pixels_offset = pixels_builder.finish( );
auto plain_pixels = rti::flat::plain_cast(pixels_offset);
for (int i = 0; i < 20000; i++) {
    plain_pixels[i].red(i % 256);
    plain_pixels[i].green((i + 1) % 256);
    plain_pixels[i].blue((i + 2) % 256);
}
```

The function rti::flat::plain_cast casts the position in memory that pixels_offset points to into a C-style array of PixelPlainHelper, a type with the same IDL definition as Pixel, but without @language_binding(FLAT_DATA).

Finally, finish_sample obtains the complete sample. After this, the Builder instance is invalid and cannot be further used.

CameraImage *image_sample=image_builder.finish_sample( );

Once the sample has been created, it is still possible to modify its values, as long as these modifications don't change the size. For example, it is possible to change the value of an existing pixel, but it's not possible to add a new one:

auto pixels_offset=image_sample->root( ).pixels( );
pixels_offset.get_element(100).blue(0);

Writing a Flat-Data Sample in C++

A regular DataWriter (for a type with a plain language binding) copies the sample contents in its internal queue during the sample serialization when its written, so when write( ) ends the application still owns the sample. A DataWriter for a flat-data type, however, doesn't copy the sample; it keeps a reference, as it is in serialized form. The application yields ownership of the data sample from the moment it calls write( ).

writer.write(*image_sample);

The DataWriter will decide when to return samples created with get_loan or build_data to a pool, where the sample will be reused.

To write again, get_loan or build_data provides a new sample.

If the sample cannot be written, it is possible to return it to the DataWriter:

writer.extensions( ).discard_loan(*image_sample);

Or, if the sample has not been completely built yet, the function discard_builder returns the resources previously acquired with build_data:

rti::flat::discard_builder(writer, image_builder);

(See also Working with unmanaged flat-data samples).

Reading a Flat-Data Sample

The method for reading data for a flat-data type is the same regardless of whether the type is final or mutable.

A DataReader is created as it would be for a regular plain type. And data samples are read as usual too:

dds::sub::LoanedSamples<CameraImage> samples=reader.take( );

Let's work with the first sample (assuming samples.length ( )>0 and samples [0].info( ).valid( )):

const CameraImage& image_sample=samples[0].data( );

Using the root Offset and the Offset to the members, the following code prints the sample values. Note that in this example image_sample is const, so camera_image is a CameraImageConstOffset, which only allows reading the buffer, not modifying it.

```
auto camera_image = image_sample->root( );
std::cout << "Source: "
    << camera_image.source( ).get_string( ) << std::endl;
std::cout << "Timestamp: "
    << camera_image.timestamp( ) << std::endl;
std::cout << "Format: " << camera_image.format( ) << std::endl;
auto resolution = camera_image.resolution( );
std::cout << "Resolution (height: " << resolution.height( )
    << ", width: " << resolution.width( ) << ")/n";
```

To access the sequence of pixels, the same two methods that allowed building it (element by element or plain cast) are available:

Method 1 (Access Each Element Offset):

```
for (auto pixel : camera_image.pixels( )) {
    std::cout << "Pixel (" << pixel.red( ) << ", " << pixel.green( )
        << ", " << pixel.blue( ) << ")\n";
}
```

Method 2 (Plain_Cast):

```
auto pixel_count = camera_image.pixels( ).element_count( );
auto plain_pixels = rti::flat::plain_cast(camera_image.pixels( ));
for (int i = 0; i < pixel_count; i++) {
    const auto& pixel = plain_pixels[i];
    std::cout << "Pixel (" << pixel.red( ) << ", " << pixel.green( )
        << ", " << pixel.blue( ) << ")\n";
}
```

Method 2 is more efficient, provided that the type meets the requirements of plain_cast. Also, the endianness of the publishing application must be the same as the local endianness.

Working with Unmanaged Flat-Data Samples

The previous sections described how to create and write DataWriter-managed samples (via get_loan or build_data). Sometimes applications may need to use unmanaged samples. For example, they may need to reuse the same sample after it is written or to obtain the memory from some other source.

To create a CameraImage using memory from an arbitrary buffer my_buffer with a capacity of my_buffer_size bytes, the CameraImageBuilder provides the following constructor:

```
unsigned char *my_buffer = . . . ;
unsigned int my_buffer_size = . . . ;
CameraImageBuilder image_builder(my_buffer, my_buffer_size);
// use image_builder . . .
CameraImage *image_sample = image_builder.finish_sample( );
``` image_builder will fail if it runs out of space.

For a final type, such as Pixel, a buffer with the serialized size of said type can be directly cast into the type:

```
unsigned char *my_pixel_buffer = . . . ;
Pixel *pixel_sample = reinterpret_cast<Pixel *>(my_pixel_buffer);
```

After writing image_sample (or pixel_sample), the DataWriter takes ownership of it. In order to reuse the sample, the application needs to monitor the on_sample_removed callback in the DataWriter listener, and correlate the cookie it receives with the sample. The following is a simple DataWriterListener implementation that does that:

```
class FlatDataWriterListener
    : public dds::pub::NoOpDataWriterListener<CameraImage> {
public:
    void on_sample_removed(
        dds::pub::DataWriter<CameraImage>& writer,
        const rti::core::Cookie& cookie) override
    {
        // The cookie identifies the sample being removed
        last_removed_sample = cookie.to_pointer<CameraImage>( );
    }
    CameraImage *last_removed_sample = NULL;
};
```

The application will need to wait until last_removed_sample is equal to image_sample. This indicates that the DataWriter no longer needs to hold ownership of image_sample.

Performance Benefits

Experimental results show a 30% reduction in latency for large data samples (25 MB) when using FDLB in C++ instead of the plain C++ language binding for a DataWriter and a DataReader that run on different machines and communicate over UDP. When they communicate on the same machine over shared memory the latency reduction can reach 50%. The benefits increase as the data size increases.

API Reference

FDLB defines the mapping of the different IDL constructs to Offsets and Builders.

User-defined types

Structs

Unions

Sequences

Arrays

Strings

Optional primitive members (the mapping for non-primitive members is the same whether they're optional or not)

The API reference is described in Appendix B in U.S. Provisional Patent Application 62/823,527 filed Mar. 25, 2019, which is incorporated by reference. The following is a summary.

| IDL type | Offset type |
|---|---|
| User-defined types | For example:<br>MyFlatFinalOffset (final struct)<br>MyFlatMutableOffset (mutable struct)<br>MyFlatUnionOffset (union) |
| Arrays | rti::flat::PrimitiveArrayOffset (array of primitive elements)<br>rti::flat::FinalArrayOffset (array of non-primitive final elements in a final type)<br>rti::flat::FinalAlignedArrayOffset (array of non-primitive final elements in a mutable type)<br>rti::flat::MutableArrayOffset (array of non-primitive mutable elements) |
| Sequences | rti::flat::PrimitiveSequenceOffset<br>rti::flat::SequenceOffset |
| Primitive types | The type itself, such as double<br>rti::flat::PrimitiveOffset (when the member is optional) |

| IDL type | Builder type |
|---|---|
| User-defined types | For example:<br>MyFlatMutableBuilder, a mutable struct<br>MyFlatUnionBuilder, a union<br>Final structs are fixed-size and do not have a Builder (see, for example, MyFlatMutableBuilder::add_my_final( )). |
| Arrays | rti::flat::MutableArrayBuilder<br>Arrays of final elements are fixed-size and do not have a Builder (see, for example, MyFlatMutableBuilder::add_my_final_array( )). |
| Sequences | rti::flat::MutableSequenceBuilder for sequences of mutable elements<br>rti::flat::FinalSequenceBuilder for sequences of final elements<br>rti::flat::PrimitiveSequenceBuilder for sequences of primitive elements<br>rti::flat::StringBuilder |
| Primitive types | Primitive members are added using one of the member functions of the Builder of the type that contains them. See, for example, MyFlatMutableBuilder::add_my_primitive( ) |

What is claimed is:

1. A method for accessing a network representation of data samples with a Data Distribution Service (DDS) type in a system using an Object Management Group (OMG) Data Distribution Service (DDS) and a Real-Time Publish Subscribe (RTPS) protocol, the method comprising:
(a) having a network representation of the data samples for the DDS type, wherein the network representation represents how the data samples are transmitted over a network;
(b) defining a first memory representation of the data samples for the DDS type equal to the network representation for the DDS type, wherein the first memory representation represents how the data samples are laid-out in memory which is determined by a first language binding;
(c) defining the first language binding for manipulating the first memory representation by providing an Application Programming Interface (API);
(d) having a plain memory representation of the data samples for the DDS type, wherein the plain memory representation represents how the data samples are laid-out in memory and is determined by a plain language binding; and
(e) having the plain language binding for manipulating the plain memory representation.

2. The method as set forth in claim 1, wherein the manipulating is constructing and introspecting the first memory representation.

3. The method as set forth in claim 1, wherein the network representation is an Extended CDR encoding version 1 (XCDR1) or an Extended CDR encoding version 2 (XCDR2).

4. The method as set forth in claim 1, wherein the first memory representation is independent of a programming language.

5. The method as set forth in claim 1, wherein the DDS type is marked with an annotation to select the first language binding.

6. The method as set forth in claim 1, wherein the first language binding accesses the first memory representation of the data samples for fixed-size DDS types using Offsets.

7. The method as set forth in claim 6, where the Offsets are generated at run-time or by a Code Generation application.

8. The method as set forth in claim 1, wherein the first language binding accesses the first memory representation of the data samples for variable-size DDS types using Builders.

9. The method as set forth in claim 8, wherein the Builders for mutable DDS types use members headers (EM-HEADER) to efficiently move through the first memory representation.

10. The method as set forth in claim 1, wherein portions of the first memory representation that are equal in the plain memory representation can be accessed using the plain language binding to improve performance.

* * * * *